United States Patent [19]
Wagg et al.

[11] Patent Number: 5,485,678
[45] Date of Patent: Jan. 23, 1996

[54] APPARATUS AND METHOD FOR MEASURING THE CIRCULARITY AND ECCENTRICITY OF A BRAKE DRUM WHILE MOUNTED UPON A VEHICLE

[75] Inventors: Theadore J. Wagg, New Hudson; James K. Clark, Canton; Robert S. Sporzynski, Chelsea, all of Mich.

[73] Assignee: Kelsey-Hayes Company, Romulus, Mich.

[21] Appl. No.: 290,333

[22] Filed: Aug. 15, 1994

[51] Int. Cl.⁶ .................................................. G01D 21/00
[52] U.S. Cl. .................................................. 33/610; 33/543
[58] Field of Search .......................... 33/600, 609, 610, 33/543, 550

[56] References Cited

U.S. PATENT DOCUMENTS

| | | | |
|---|---|---|---|
| 1,898,136 | 2/1933 | Miller et al. | 33/610 |
| 1,997,639 | 4/1935 | Hetherington et al. | 33/610 |
| 2,083,944 | 6/1937 | Cottrell | 33/610 |
| 2,087,497 | 7/1937 | Blackman | 33/610 |
| 2,648,134 | 8/1953 | Billeter | 33/610 |
| 3,006,076 | 10/1961 | Wisti | 33/610 |
| 3,854,216 | 12/1974 | Mosher | 33/609 |
| 3,889,378 | 6/1975 | Senecal . | |
| 4,520,568 | 6/1985 | Drenner | 33/610 |
| 4,782,595 | 11/1988 | Diewert . | |
| 5,151,870 | 9/1992 | Beebe et al. | 33/543 |
| 5,224,272 | 7/1993 | Toraason et al. | 33/550 |

*Primary Examiner*—Thomas B. Will
*Attorney, Agent, or Firm*—MacMillan, Sobanski & Todd

[57] ABSTRACT

An apparatus and method for measuring the circularity of a brake drum while the brake drum is mounted upon a vehicle. The apparatus includes a linear voltage displacement transducer mounted upon a stationary portion of the vehicle. The transducer senses the variation of the braking surface and generates a signal proportional thereto. The apparatus also includes an optical encoder that generates a signal indicative of the angular position of the drum. The transducer and encoder are connected to a central processing unit which receives the transducer and encoder signals. The drum is rotated through a plurality of complete revolutions while the central processing unit combines the transducer and encoder signals to generate a set of data points. The central processing unit operates upon the data points to determine the circularity of the braking surface.

24 Claims, 4 Drawing Sheets

FIG. I

APPARATUS AND METHOD FOR MEASURING THE CIRCULARITY AND ECCENTRICITY OF A BRAKE DRUM WHILE MOUNTED UPON A VEHICLE

BACKGROUND OF THE INVENTION

This invention relates in general to vehicle brake drums and in particular to an apparatus and method for measuring the circularity and eccentricity of a brake drum while the brake drum is mounted upon a vehicle.

Most vehicles are equipped with a brake system for retarding or stopping movement of the vehicle in a controlled manner. A typical brake system for an automobile or a light truck includes a disc brake assembly for each of the front wheels and either a disc brake assembly or drum brake assembly for each of the rear wheels. The brake assemblies are actuated by hydraulic or pneumatic pressure which is generated when the vehicle operator depresses a brake pedal.

A typical drum brake assembly includes a rigid backing plate which is secured to a stationary portion of the vehicle, such as the end of a tubular axle housing. The backing plate carries a brake shoe assembly which includes a pair of arcuate-shaped brake shoes and associated return springs. The drum brake assembly also includes an actuator which is operatively connected to the brake shoes. In a brake system actuated by hydraulic pressure, the actuator is usually embodied as a brake cylinder. In a brake system actuated by pneumatic pressure, the actuator is usually embodied as a cam actuator. In both types of brake systems, an access slot is usually formed through the backing plate. The access slot allows insertion of brake adjustment tools into the brake assembly. Such a brake adjustment slot is typically included on all light trucks and automobiles weighing less than 10,000 pounds (4,536 KG).

A typical drum brake assembly further includes an annular brake drum which completely surrounds the brake shoe assembly. Often, a portion of the brake drum extends over the backing plate so as to prevent water and dirt from entering within the brake drum assembly. The brake drum is provided with an inner braking surface which is disposed about the brake shoe assembly. The brake drum is bolted between a rotatable wheel hub and a vehicle wheel. Thus, when the vehicle wheel turns, the brake drum rotates with it about the stationary brake shoe assembly. Usually, the wheel hub is provided at the end of an axle shaft rotatably supported within the axle housing. Ideally, the inner braking surface of the brake drum is precisely cylindrical in shape, and the axis of rotation of the brake drum is precisely concentric with the axis of rotation of the axle shaft.

During operation of the brake system, hydraulic or pneumatic pressure is generated when the operator depresses the brake pedal. As a result, the actuator urges the non-rotating brake shoes outwardly toward the inner braking surface of the rotating brake drum. As the brake shoes contact the inner braking surface, friction generates a braking torque which slows the rotation of the vehicle wheel and, if maintained, will completely stop such rotation.

In order to achieve a smooth braking action, two factors are important. The first factor is that the inner braking surface of the brake drum be precisely circular. Brake drum circularity is indicative of the amount of variation in the inner braking surface from a perfectly round cylinder. One manner of measuring brake drum circularity is to measure the difference between the maximum and minimum diameters of the inner braking surface. Another manner of measuring brake drum circularity is to measure the maximum change in braking surface radius over a sector having a predetermined size, such as thirty degrees. This latter measurement is commonly referred to as a "rate of change", although neither time nor mathematical differentiation are involved in the calculation thereof. In either event, improper brake drum circularity is usually the result of a defect in the structure of the brake drum.

The second factor for achieving smooth braking action is that the inner braking surface of the brake drum be precisely concentric with respect to the axis of rotation of the axle shaft upon which it is mounted. Brake drum eccentricity is indicative of the amount of variation between the axis of rotation of the brake drum with respect to the axis of rotation of the axle shaft. Brake drum eccentricity usually results from the stack-up tolerances of the various wheel mounting components and the mounting holes of the brake drum. Additionally, brake drum eccentricity can result from distortion of the brake drum, such as can be caused by uneven torquing of the wheel nuts. Improper brake drum circularity is, therefore, usually the result of defects in the manufacture or assembly of the wheel mounting components.

When a brake drum is mounted upon a vehicle, the combined effect of brake drum circularity and brake drum eccentricity is often referred to as the "installed runout" of the brake drum. If the installed runout is excessive, the braking action which occurs when the brake shoes engage the inner braking surface of the brake drum will be rough. Rough braking action is undesirable for a number of reasons, including safety and comfort. Thus, it is desirable to measure brake drum circularity and brake drum eccentricity to prevent this from occurring.

To measure brake drum circularity, it is known in the art to remove the brake drum from the vehicle and measure the inside diameter thereof at various locations. If the maximum inside diameter exceeds a predetermined value, the drum is considered to be defective. It also is known in the art to measure the inside diameter of the brake drum while the brake drum is mounted upon the vehicle. An apparatus and method for doing so is described in U.S. Pat. No. 4,782,595 to Diewert.

To measure installed runout, it is known in the art to remove the brake drum from the vehicle and use relatively sophisticated test equipment to measure both the brake drum circularity and brake drum eccentricity components. By using such test equipment, the individual values of brake drum circularity and brake drum eccentricity can be determined. It is also known to measure the installed runout of the brake drum while it is mounted upon a vehicle. However, known test equipment for measuring the installed runout of the brake drum while it is mounted on the vehicle cannot determine the individual values of brake drum circularity and brake drum eccentricity. Inasmuch as the removal of the brake drum from the vehicle for testing is relatively time consuming and expensive, it would be desirable to provide an improved test fixture which is capable of determining the individual values of brake drum circularity and brake drum eccentricity while the brake drum is mounted on the vehicle.

SUMMARY OF THE INVENTION

This invention relates to an apparatus and method for measuring the circularity and eccentricity of a brake drum while it is mounted upon a vehicle. The apparatus includes means for measuring the distance from an assumed axis of rotation of the brake drum to each of a plurality of data points on an inner braking surface of the brake drum. This distance measuring means can include a linear voltage displacement transducer (LVDT) having a stylus which engages the inner braking surface of the brake drum. The LVDT generates an electrical output signal which is representative of such distance. The apparatus also includes means for sensing the relative angular position of the brake drum at each of the data points and for generating an electrical output signal which is indicative thereof. This angular sensing means can include an optical encoder having a rotatable shaft which engages a portion of the brake drum or other rotatable component, such as the axle shaft, upon which the brake drum is mounted. The signal from the distance measuring means and the angular sensing means are fed to a processing means which combines them to define each of the data points. A storage means connected to the processing means receives and retains each of the data points. The processing means can be programmed to calculate a fitted closed curve to the plurality of data points and to determine a center therefor. The processing means can also be programmed to calculate an inscribed first circle within the closed curve and a circumscribed second circle about the closed curve, both of which are centered upon the calculated center. Lastly, the processing means can be programmed to calculate the difference between the radii of the first and second circles to determine the circularity of the brake drum.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
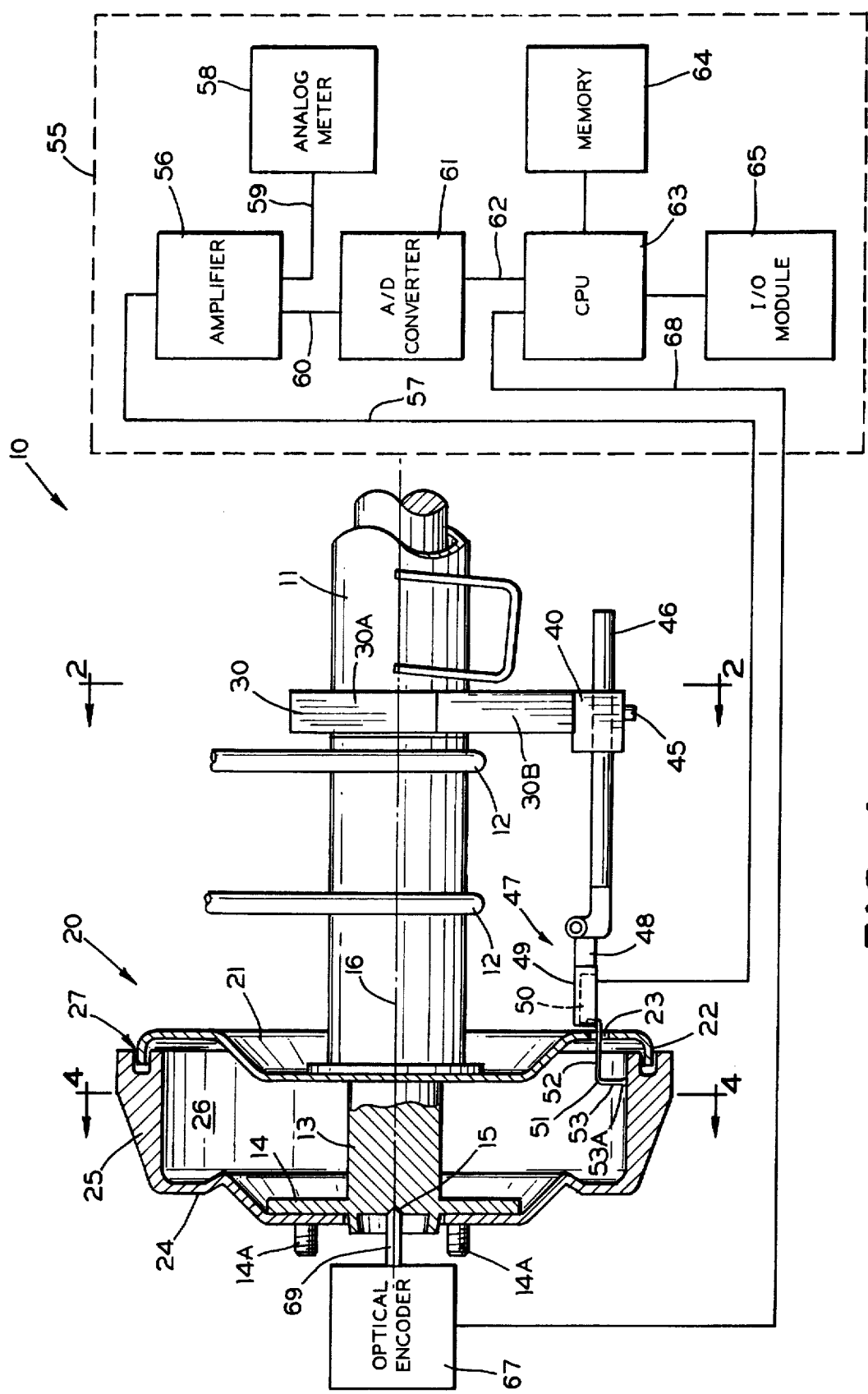
FIG. 1 is a schematic diagram of a portion of a vehicle having an apparatus for measuring brake drum circularity and brake drum eccentricity in accordance with this invention installed thereon.

Referring now to the drawings, there is illustrated in FIG. 1 a schematic diagram of a portion of a vehicle having an apparatus, indicated generally at 10, for measuring brake drum circularity and brake drum eccentricity in accordance with this invention mounted thereon. The apparatus 10 is mounted on a conventional tubular rear axle housing 11 of a rear wheel drive vehicle. The axle housing 11 is attached to a frame (not shown) of the vehicle by U-bolts 12. Although this invention will be described and illustrated in the context of a rear wheel drive vehicle, it will be appreciated that this invention can be practiced upon other types of vehicles. Similarly, the apparatus 10 may be mounted on the axle housing 11 by other conventional means or attached to other portions of the vehicle and its frame.

The axle housing 11 encloses a rotatable axle shaft 13. At the outboard end of the axle shaft 13, a disc-shaped wheel hub 14 is provided. In the illustrated embodiment, the hub 14 is formed integrally with the axle shaft 13, although such is not necessary. A plurality of wheel studs 14A extend axially from the outboard side of the hub 14. Also, a shallow recess 15 is formed in the center of the hub 14. The recess 15 is located on an axis of rotation 16 defined by the axle shaft 13.

A conventional drum brake assembly, indicated generally at 20, is provided at the outboard ends of the axle housing 11 and axle shaft 13. The brake drum assembly 20 includes a rigid disc-shaped backing plate 21 which is secured to the outboard end of the axle housing 11. The backing plate 21 includes an outer annular lip 22 which extends axially away from the axle housing 11. An oblong access slot 23 is formed through the lower portion of the backing plate 21. The access slot 23 allows insertion of brake adjustment tools into the brake assembly 20 in a known manner. A brake shoe assembly (not shown) and a brake assembly actuator (not shown) are carried on the backing plate 21. The brake shoe assembly and brake assembly actuator are conventional in the art and have been omitted from FIG. 1 for clarity.

The brake drum assembly 20 further includes a brake drum 24 which is mounted on the hub 14. To accomplish this, a plurality of apertures (not shown) are formed through the central portion of the brake drum 24. The apertures receive the wheel studs 14A so as to support the brake drum 24 on the hub 14 for rotation therewith. The brake drum 24 has an outer annular portion 25 which extends axially inwardly toward the axle housing 11. The outer annular portion 25 of the brake drum 24 is formed having an internal annular braking surface 26. The end of the outer annular portion 25 of the brake drum 24 adjacent to the backing plate 21 has a circumferential groove 27 formed therein. The annular lip 22 of the backing plate 21 extends within the circumferential groove 27 to protectively enclose the brake shoe assembly and the brake actuator assembly. As is well known in the art, the brake actuator assembly can be selectively operated to move portions of the brake shoe assembly into frictional engagement with the braking surface 26 of the brake drum 24 to retard rotation of the wheel hub 14.

Figure 2:
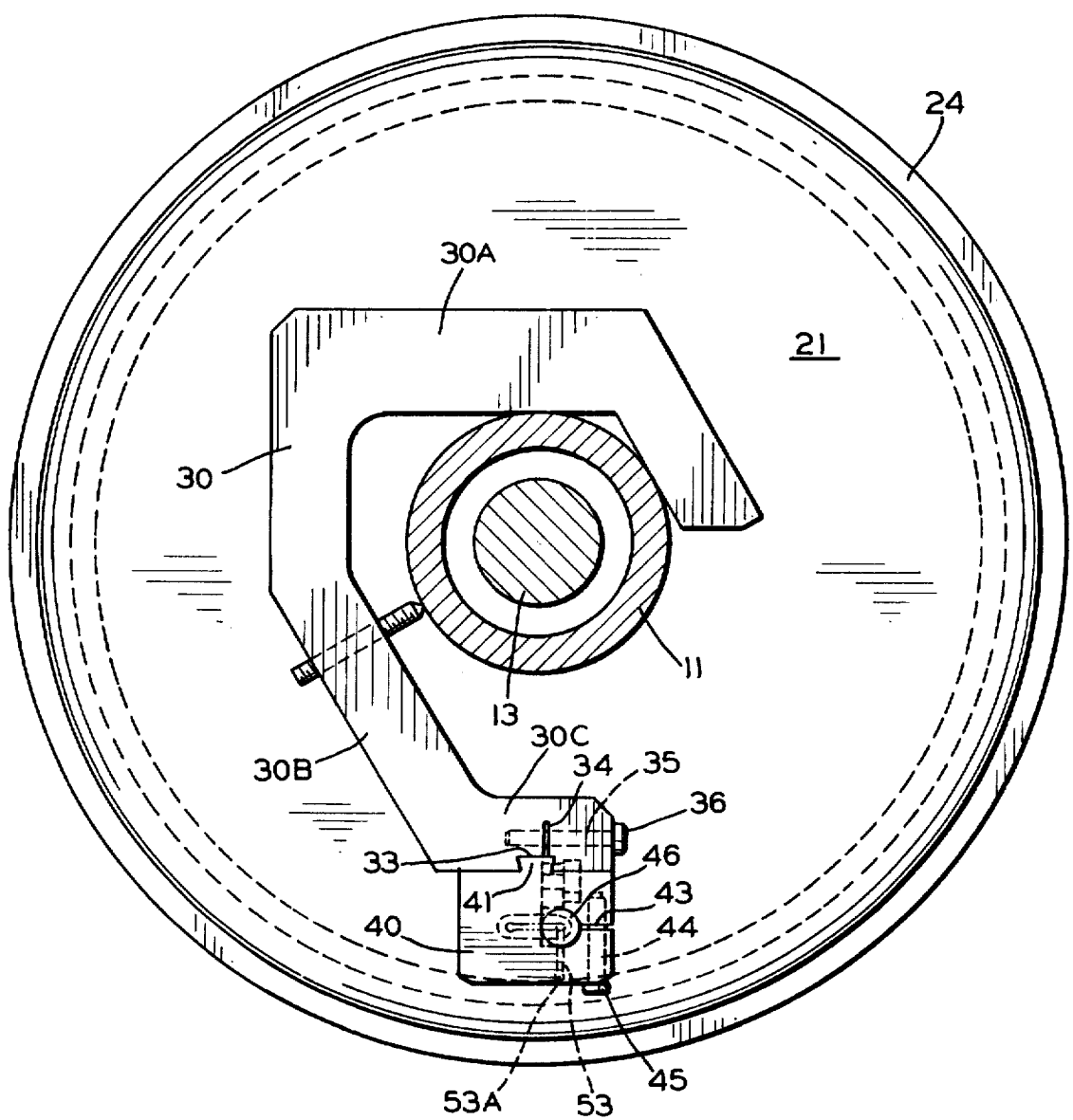
FIG. 2 is a sectional view of the apparatus taken along line 2—2 of FIG. 1.

As best shown in FIG. 2, the apparatus 10 of this invention includes a generally C-shaped hanger bracket, indicated generally at 30. The bracket 30 includes an upper portion 30A, an intermediate portion 30B, and a lower portion 30C. The upper portion 30A of the bracket 30 extends above and about a portion of the axle housing 11. A set screw is disposed within a threaded bore formed through the intermediate portion 30B of the bracket 30. The set screw can be advanced into contact with the axle housing 11 to clamp the bracket 30 thereto.

Figure 3:
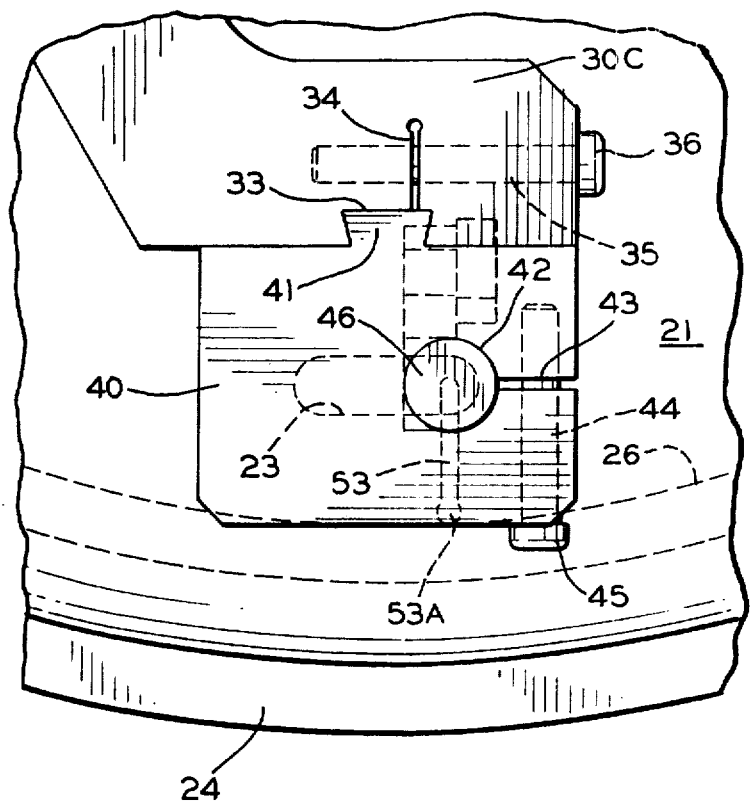
FIG. 3 is an enlarged view of a portion of the apparatus shown in FIG. 2.

Referring to FIG. 3, the lower portion 30C of the bracket 30 has a groove 33 formed therein. The groove 33 extends parallel to the axle housing 11. An axial slot 34 is also formed in the lower portion 30C of the bracket 30, extending upwardly from the top of the groove 33. A transverse threaded bore 35 is formed in the lower portion 30C of the bracket 30 which intersects the slot 34, and a threaded bracket fastener 36 is disposed in the bore 35. The purposes of the groove 33, the slot 34, and the threaded fastener 36 will be explained below.

A mounting block 40 is slidably mounted on the lower portion 30C of the bracket 30. To accomplish this, the mounting block 40 has an integral tongue 41 formed on the upper surface thereof. The tongue 41 is complementary in size and shape to the groove 33 formed in the lower portion 30C of the bracket 30. Thus, the mounting block 40 is supported on the lower portion 30C of the bracket 30 for axial sliding movement. The mounting block 40 can be releasably retained in a desired position relative to the lower portion 30C of the bracket 30 by tightening the threaded fastener 36. Such tightening compresses the size of the slot 34, resulting in frictional engagement of the tongue 41 by the lower portion 30C of the bracket 30.

A relatively large non-threaded bore 42 is formed through the block 40 which also extends parallel with the axle housing 11. Similar to the bracket 30 described above, an axial slot 43 is formed in the mounting block 40, extending from the side of the non-threaded bore 42. A transverse threaded bore 44 is formed in the mounting block 40 which intersects the slot 43, and a threaded bracket fastener 45 is disposed in the bore 44. The purposes of the non-threaded bore 42, the slot 43, and the threaded fastener 45 will be explained below.

A cylindrical spacer bar 46 extends through the non-threaded bore 42 and is supported therein for both rotational and sliding movement relative to the mounting block 40. The spacer bar 46 extends parallel with the axle housing 11 toward the brake assembly 20. The spacer bar 46 can be releasably retained in a desired position relative to the mounting block 40 by tightening the threaded fastener 45. Such tightening compresses the size of the slot 43, resulting in frictional engagement of the spacer bar 46 by the mounting block 40.

Referring back to FIG. 1, a gauge head assembly, indicated generally at 47, is provided at the outboard end of the spacer bar 46 adjacent to the brake drum assembly 20. The gauge head assembly 47 includes an L-shaped holder 48 having a first leg and a second leg. The first leg of the holder 48 is secured to the outboard end of the spacer bar 46 by any conventional means. A gauge head 49 is mounted on the outboard end of the second leg. The gauge head 49 contains a linear voltage displacement transducer (LVDT), which is shown in phantom at 50 in FIG. 1. An L-shaped stylus 51 is connected to the LVDT 50. A first portion 52 of the stylus 51 extends axially outwardly from the LVDT 50 through the access slot 23 formed through the backing plate 21. A second portion 53 of the stylus 51 extends perpendicular from the first portion 52 and terminates in a tip 53A. A spring (not shown) contained with the gauge head assembly 47 urges the stylus tip 53A into contact with the braking surface 26 of the brake drum 24, as shown in FIG. 1. As will be discussed below, this is the normal operating position for the stylus 51.

The LVDT 50, which is conventional in the art, senses relative movement of the stylus 51 and generates an electrical or similar output signal having a magnitude which varies therewith. A commercially available gauge head assembly 47 having a stylus 51 operatively connected to a linear variable differential transformer core has been used successfully in the invention. This gauge head is Model No. T-231 from Giddings and Lewis Measurement Systems in Dayton, Ohio. Other types of LVDTs, such as those including Hall Effect devices, can be used in the gauge head assembly 47.

The apparatus 10 also includes a data processing circuit 55 for processing the output signals which are generated by the LVDT 50. The data processing circuit 55 includes an amplifier 56 which receives the output signal from the LVDT 50 through an electrical conductor 57. It will be appreciated that the electrical conductor 57, as well as the other electrical conductors illustrated as single lines in FIG. 1, can be embodied as multiple wires which transfer signals between the various devices illustrated therein. The amplifier 56 is provided to increase the magnitude of the output signal from the LVDT 50. The output of the amplifier 56 is connected to the input of an analog meter 58 by a second electrical connector 59. As described below, the analog meter 58 is provided to assist in the calibration of the amplifier 56. A digital meter or other measuring device can be substituted for the analog meter 58. The analog meter 58 can also be included as an integral component of the amplifier 56.

The output of the amplifier 56 is also connected through a third electrical connector 60 to an analog to digital converter 61. The converter 61 is provided to change the amplified analog output signal from the LVDT 50 to a digital signal for further processing. The digital output signal from the converter 61 is supplied through a fourth electrical connector 62 to a central processing unit 63. In a manner described in detail below, the central processing unit 63 processes the amplified and digitized output signal from the LVDT 50. The central processing unit 63 is connected to a memory unit 64 and an input/output module 65. The memory unit 64 is provided for storing data and operating instructions for the central processing unit 63. The input/output module 65 includes means for loading instructions and data into the central processing unit 63 and for downloading results and data therefrom, such as in printed or displayed form.

The individual components of the data processing circuit 55 described above are all conventional and well known in the art. It will be appreciated that other combinations of components can be substituted for the various components in the illustrated data processing circuit 55. For example, the amplifier 56, the analog meter 58, the converter 61, the central processing unit 63, the memory unit 64 and input/output module 65 can all be included in a single processor unit (not shown). As an alternative, a lap top computer (not shown) can be used for the central processing unit 63, the memory unit 64, and the input/output module 65. Similarly, the central processing unit 63 and the memory unit 64 can be combined in a programmable logic controller (not shown).

A circuit is provided for sensing the angular position of the brake drum 24 as it rotates relative to the vehicle. In the preferred embodiment, this angular sensing circuit includes an optical encoder 67. The optical encoder 67 is connected by a fifth electrical connector 68 to the central processing unit 63. The optical encoder 67 includes a rotatable shaft 69 having a tapered end which is received in the recess 15 formed in the axial center of the wheel hub 14. The optical encoder 67 can be manually held in the illustrated position by an operator of the apparatus 10 during the testing process described below. Alternatively, a supporting fixture (not shown) may be provided to maintain the optical encoder 67 in the illustrated position.

In either event, rotation of the wheel hub 14 causes corresponding rotation of the shaft 69. The optical encoder 67 is responsive to such rotation of the shaft 69 for generating an electrical or other output signal which is representative thereof. This angular position signal is transmitted through the fifth electrical connector 68 to the central processing unit 63. An example of a commercially available optical encoder which has been successfully used in this invention is Accu-Coder Model No. 725H-OC available from Encoder Products Co. in Sandusky, Ohio. However, it will be appreciated that any other conventional encoding apparatus, optical or otherwise, may be used to generating the angular position signals to the central processing unit 63.

Figure 5:
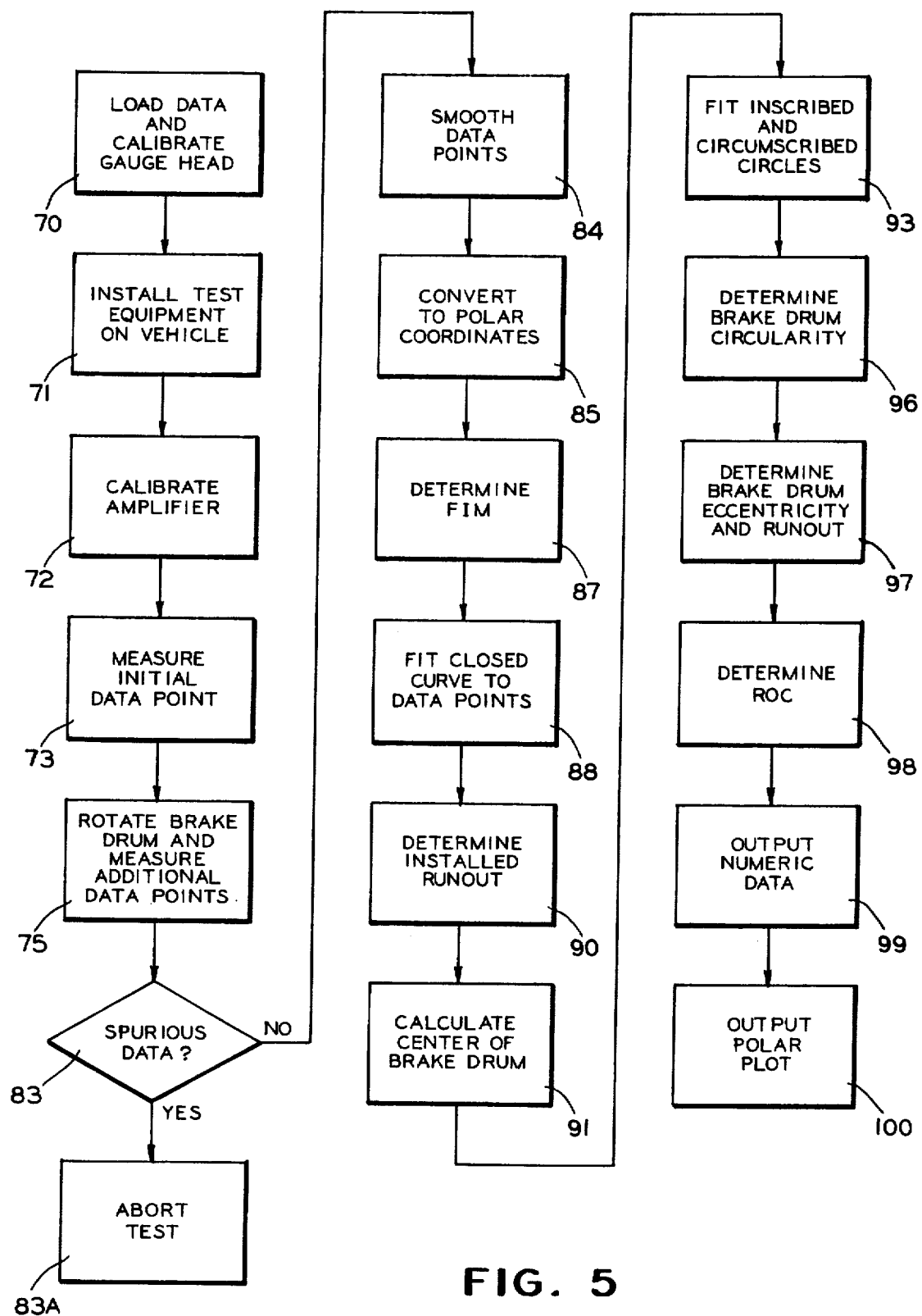
FIG. 5 is a flow chart illustrating the steps in the method for measuring brake drum circularity and brake drum eccentricity in accordance with the apparatus shown in FIG. 1.

Referring now to FIG. 5, the operation of the apparatus 10 will be be described. First, as shown in step 70, initial instructions and test data are loaded into the central processing unit 63. The initial test data includes the nominal inside diameter of the brake drum 24 to be tested and can include the type of vehicle upon which the brake drum 24 is mounted. At the same time, the gauge head assembly 47 is calibrated in a known manner. For example, this can be accomplished by mounting the gauge head assembly 47 on a calibration fixture (not shown) and moving the stylus tip 53A over a Johanisan gauge block (not shown) having a known variation in thickness. As a result, incremental movements of the stylus tip 53A can be correlated with incremental changes in the output signal from the LVDT 50.

Next, as shown in step 71, the apparatus 10 is installed on a test vehicle. To accomplish this, the vehicle is preferably raised up by a hoist to provide easy access to the brake drum 24 to be measured. The axle housing 11 is supported to allow free rotation of the brake drum 24 during the test. The upper portion 30A of the bracket 30 is placed over the axle housing 11, as shown in FIG. 2. A conventional jig (not shown) can be used to assist in properly positioning the bracket 30 on the axle housing 11. When properly positioned, the set screw is tightened to secure the bracket 30 to the axle housing 11, as described above.

The mounting block 40 is then mounted on the bracket 30 by inserting the tongue 41 thereof within the groove 33. The mounting block 40 can then be moved to a desired axial position relative to the bracket 30 and secured in position by tightening the threaded fastener 36, as described above. The spacer bar 46 is inserted with the bore 42 formed through the mounting block 40. As discussed above, the spacer bar 46 carries the gauge head assembly 47 and the stylus 51. The spacer bar 46 is rotated and moved axially relative to the mounting block 40 such that the stylus 51 is first inserted through the access slot 23 formed through the backing plate 21, then moved to the normal operating position illustrated in FIG. 1. In this position, the stylus tip 53A contacts the braking surface 26 of the brake drum 24. The mounting block fastener 45 is then tightened to secure the spacer bar 46 in this position. Lastly, the optical encoder 67 is installed as described above such that the encoder shaft 69 engages the recess 15 formed in the axial center of the wheel hub 14.

As shown in step 72, the amplifier 56 is then calibrated. To accomplish this, the brake drum 24 is rotated through one complete revolution. As the brake drum 24 is rotated, the gauge head assembly 47 is maintained in a stationary position relative to the axle housing 11 by the bracket 30 and spacer rod 46. However, the stylus tip 53A, which engages the braking surface 26, moves radially inwardly and outwardly as it traces variations in the radius of the braking surface 26 when the brake hub 24 is rotated. The LVDT 50 generates an output signal having a magnitude which varies with the amount of radial movement of the stylus tip 53A. The amplifier 56 amplifies the output signal from the LVDT 50, and this amplified signal is displayed on the analog meter 58. By watching the analog meter 58, an operator can adjust the gain of the amplifier 56 such that the output signal therefrom varies about a predetermined midrange value. In this manner, the amplifier 56 is calibrated to assure that the full range of variation of the braking surface 26 will be measured.

Figure 4:
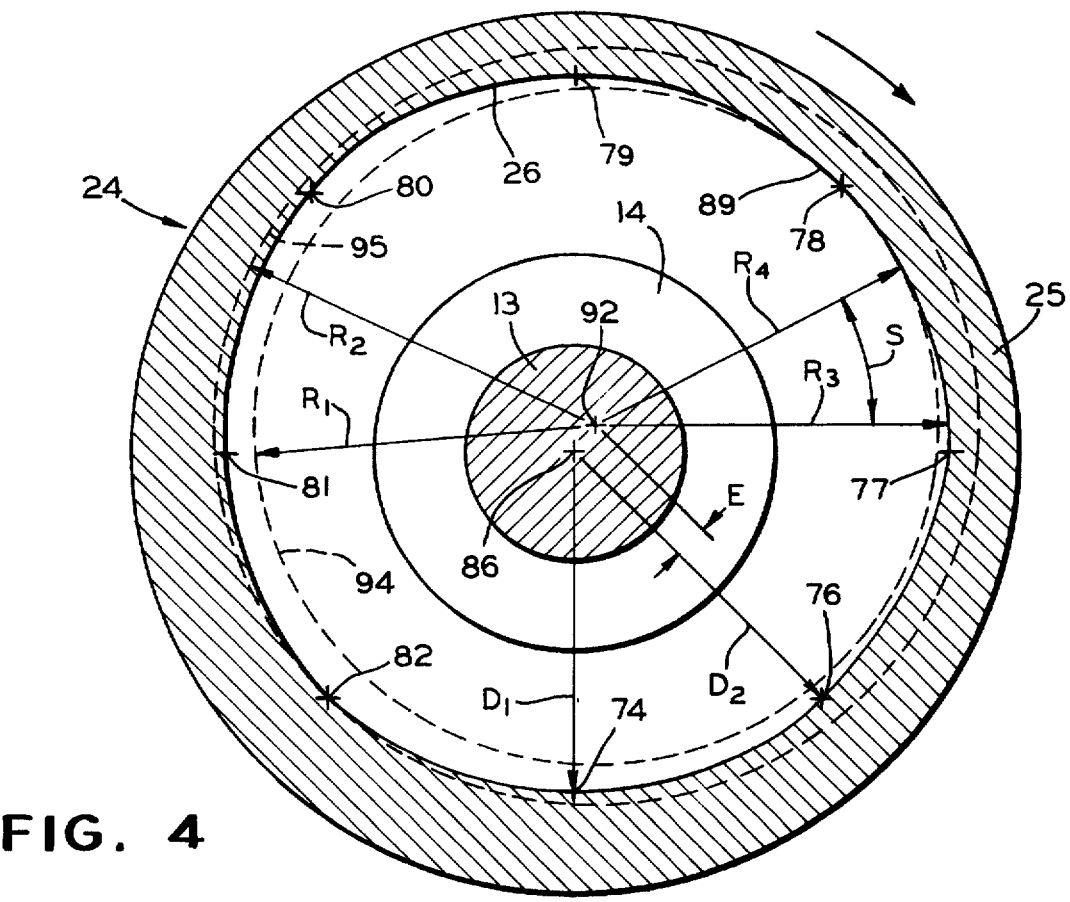
FIG. 4 is a sectional view of the apparatus taken along line 4—4 of FIG. 1 illustrating a plurality of data points taken during operation of the apparatus.

In step 73 of the method, the brake drum circularity measurement process begins by measuring an initial data point, which is indicated at 74 in FIG. 4. To do this, the brake drum 24 is positioned at an initial angular position relative to the axle housing 11. The LVDT 50 generates an initial output voltage which is amplified by the amplifier 56 and converted to a digital output signal by the converter 61. The resulting digital output signal is sent to the central processing unit 63, which also receives an initial angular position signal from the optical encoder 67. The central processing unit 63 combines the initial output signal from the LVDT 50 and the initial angular position signal from the optical encoder 67 to define the initial data point 74. The initial data point 74 is then stored in the memory unit 64 of the data processing circuit 55.

Similarly, as shown in step 75, additional data points are subsequently obtained by rotating the brake drum 24 and making additional measurements. As the brake drum 24 is rotated (for example, clockwise when viewing FIG. 4), the output signal from the LVDT 50 varies with changes in the radius defined between the axis of rotation 16 of the axle shaft 13 and the braking surface 26 of the brake drum 24. At the same time, the optical encoder 67 generates a series of signals indicating sequential angular positions of the brake drum 24 relative to the axle housing 11. When an angular position signal is received by the central processing unit 63 from the optical encoder 67, the amplified and digitized output signal from the LVDT 50 is sampled and stored in the memory unit 64.

This sampling process is illustrated in FIG. 4 as being repeated to generate seven additional data points indicated at 76, 77, 78, 79, 80, 81 and 82. In the illustrated embodiment, the data points 74, 76, 77, 78, 79, 80, 81 and 82 are equidistantly spaced apart from one another at forty-five degree intervals. However, it has been found that the accuracy of the circularity measurement is increased as more data points are taken. Preferably, data points are measured and stored for each single degree of relative angular movement between the brake drum 24 and the axle shaft 13. Furthermore, it is preferable that data points be measured and stored throughout three complete revolutions of the brake drum 24. Thus, in the preferred embodiment, a total of one thousand eighty data points are measured and stored before further processing occurs.

In the next step 83, the stored data points are screened to eliminate spurious data. Specifically, the magnitudes of the output signals from the LVDT 50 are reviewed by the central processing unit 63 for spurious values. Such spurious values can be caused by electrical transients, mechanical malfunctions in the apparatus 10, or dirt on the braking surface 26. In the preferred embodiment, the screening analysis is performed by determining if the difference between any two output signals generated at the same relative angular position is greater than a predetermined value. If so, the data points at that particular angular position will be considered inaccurate, and the data can be ignored. Alternatively, the entire test can be aborted, as shown in step 83A, if unreliable data is determined. For example, if the difference between the output signals generated at the same relative angular position is greater than 0.001 inch (0.0254 mm), the data points at that particular angular position can be considered inaccurate. Other standards can be employed for determining whether the sampled data points are acceptable for further evaluation.

A data smoothing operation can then be applied to the data points by the central processing unit 63, as shown in step 84. The smoothing operation is operative to determine a single output value for the LVDT 50 for each of the sampled angular positions. The smoothing operation can be performed as a simple average of the three output signal measurements obtained at each of the sampled angular positions. Alternatively, a more sophisticated process, such as use of the known Savitzkey-Golay algorithm, can be performed. Upon completion of the data smoothing step, a single output signal magnitude is obtained for each of the sampled angular positions. Thus, in the preferred embodiment, the smoothing operation reduces the data base from one thousand eighty data points to three hundred sixty data points for use in the remaining steps in the method.

The data points which remain after the data smoothing operation are converted to polar coordinates by the central processing unit 63, as shown in step 85. The conversion process begins with generation of an assumed axis of rotation 86 for the brake drum 24. The assumed axis of rotation 86 is determined by dividing in half the nominal brake drum diameter, which was loaded into the central processing unit 63 in step 70. The resulting distance "D1" (see FIG. 4) locates the assumed axis of rotation 86 in the center of the brake drum 24. It has been found that the assumed axis of rotation 86, when generated in this manner, is sufficiently close to the actual axis of rotation 16 (defined by the axle shaft 13) that any variation therebetween can be ignored without adversely affecting the accuracy of the calculations described below. Thus, the first data point 74 is converted into polar coordinates by associating the distance D1 with the relative angle determined by the optical encoder 67. It will, therefore, be appreciated that the distance D1 represents the distance from the assumed axis of rotation 86 to the point of contact of the stylus tip 53A on the braking surface 26 at the initial data point 74.

The second data point 76 is converted into polar coordinates in a similar manner. A distance "D2" is calculated as being equal to the initial distance "D1" plus or minus a magnitude based upon the change in the magnitude of the output signals from the LVDT 51 between the first data point 74 and the second data point 76. If the magnitude of the output signal at the second data point 76 is greater than the magnitude of the output signal at the initial data point 74, the initial distance "D1" is increased by a predetermined amount to determine the second distance "D2". If the magnitude of the output signal for the second data point 76 is less than the magnitude of the output signal for the initial data point 74, the initial distance "D1" is decreased by a predetermined amount to determine the second distance "D2". The amount of this increase or decrease is based upon the initial calibration of the gauge head assembly 47 described above. The resulting distance "D2" in FIG. 4 represents the distance from the axis of rotation 16 to the point of contact of the stylus tip 53A on the braking surface 26 at the second data point 76. Thus, the second first data point 76 is converted into polar coordinates by associating the distance D2 with the relative angle determined by the optical encoder 67.

The above process is repeated for the remaining data points 77 through 82. When completed, all of the output signals will be converted to polar coordinates having distances from the assumed axis of rotation 86 associated with with the relative angle determined by the optical encoder 67. It will be appreciated that the central processing unit 63 can convert the data points into other types of coordinates, such as rectangular coordinates.

As shown in step 87, a full indicated movement (FIM) value for the brake drum 24 is then calculated by the central processing unit 63. The FIM value represents the difference between the largest and smallest distances measured between the assumed axis of rotation 86 and any of the data points. The minimum distance is subtracted from the maximum distance to determine the FIM value.

Next, a closed curve is calculated based upon the various data points, as shown in step 88. The closed curve can be calculated by any one of several known curve fitting algorithms, such as the Gauss Jordan algorithm. Generally, the more data points which are used to fit the closed curve, the more closely such closed curve will approximate the actual shape of the braking surface 26. In the preferred embodiment, the three hundred sixty data points permit the calculation of a closed curve which very closely approximates the actual shape of the braking surface 26. In FIG. 4, the fitted closed curve is illustrated at 89 as being congruent with the braking surface 26.

The installed runout for the brake drum 24 is next calculated, as shown in step 90. The installed runout can be calculated as the maximum difference in the distance between the assumed axis of rotation 86 and the closed curve 89. The minimum and maximum distances from the assumed axis of rotation 86 to the closed curve 89 are determined by the central processing unit 63. The minimum distance is then subtracted from the maximum distance to determine the installed runout. It will be appreciated that the installed runout can be different from the FIM value described above. However, the closer the closed curve 89 approximates the actual shape of the braking surface 26, the closer the value of the installed runout will be to the FIM value.

Next, as shown in step 91, an axial center for the brake drum 24 is calculated by the central processing unit 63. The calculation of the brake drum center is based upon the closed curve 89 previously calculated by the central processing unit 63. To accomplish this, the central processing unit 63 creates a planar figure having a circumferential shape which matches the shape of the calculated closed curve 89. Then, the central processing unit performs a numerical integration technique to determine the centroid of the planar figure. The centroid defines the calculated center of the brake drum 24. This calculated brake drum center is illustrated at 92 in FIG. 4.

In the next step 93 of the process, an inscribed circle 94 and a circumscribed circle 95 are generated for the closed curve 89. As shown in FIG. 4, the inscribed circle 94 is located within the closed curve 89, while the circumscribed circle 95 is located about the closed curve 89. The inscribed circle 94 is centered on the calculated brake drum center 92 and has a radius "R1" which is equal to the smallest distance between the calculated brake drum center 92 and the closed curve 89. The circumscribed circle 95 is centered on the calculated brake drum center 92 and has a radius "R2" which is equal to the largest distance between the calculated brake drum center 92 and the closed curve 89.

Next, the circularity of the brake drum 24 is calculated by the central processing unit 63, as shown in step 96. This circularity can be calculated as the difference between the radii of the circumscribed and inscribed circles 95 and 94, or "R2" less "R1". Then, the eccentricity of the brake drum 24 is calculated by the central processing unit 63, as shown in step 97. This eccentricity can be calculated as the distance between the assumed axis of rotation 86 and the calculated brake drum center 92, indicated at "E" in FIG. 4. The magnitude of the eccentricity "E" is equal to one half of a brake drum parameter referred to as the "brake drum runout". The eccentricity and brake drum runout are determined by the central processing unit 63 in step 97.

Finally, the variation of the radius of the closed curve 89, or rate of change (ROC), over consecutive sectors of a predetermined number of degrees is determined by the central processing unit 63, as indicated in step 98. A typical sector is defined in FIG. 4 by two sector radii, R3 and R4, which connect the calculated center 92 to the closed curve 89. The sector radii are separated by "S" degrees. The variation in the brake surface 26 over the sector is (R4–R3). The sector is indexed by a predetermined number of degrees and the ROC calculation repeated. In the preferred embodiment, the central processing unit 63 calculates an ROC for a thirty degree sector and then indexes the sector by one degree. The ROC calculation is repeated until the thirty degree sector has been indexed completely around the closed curve 90. The central processing unit 63 selects the maximum ROC as the brake drum ROC.

The numeric data is output by the central processing unit 63 in step 99, In the preferred embodiment, the circularity, brake drum runout and the maximum ROC are printed, however, any or all of the calculated values can be printed. Alternatively, the data can be displayed on a monitor screen. Finally, in step 100, a polar plot of the closed curve 89 is printed. Thus, it is possible to determine the shape of the braking surface 26 of a brake drum 24 and both the circularity and eccentricity, or brake drum runout without removing the brake drum 24 from the vehicle.

In accordance with the provisions of the patent statutes, the principle and mode of operation of the invention have been explained and illustrated in its preferred embodiment. However, it must be understood that this invention may be practiced otherwise than as specifically explained and illustrated without departing from its spirit or scope.

What is claimed is:

1. An apparatus for measuring the circularity of a brake drum, the drum being mounted upon a vehicle and rotatable about an axis of rotation, the apparatus comprising:

means adapted for mounting on a stationary portion of the vehicle for sensing a variation of a distance extending from the axis of rotation to a braking surface formed on an inner surface of the brake drum, said variation sensing means generating a first signal proportional to said variation;

means for sensing an angular position of the brake drum, said angular position sensing means generating a second signal indicative of the angular position of the drum; and processing means connected to said variation sensing means and said angular position sensing means for receiving and operatively combining said first and second signals to define a data point.

2. An apparatus, as defined in claim 1, wherein said processing means includes a means for storing said data point.

3. An apparatus, as defined in claim 1, wherein said variation sensing means generates a plurality of first signals when the brake drum is rotated, and further wherein said angular position sensing means generates a plurality of second signals when the brake drum is rotated, said processing means receiving and consecutively operatively combining said first and second signals to define a plurality of data points.

4. An apparatus, as defined in claim 1, wherein said means for sensing angular position generates said second signal after the drum is rotated through a predetermined number of degrees.

5. An apparatus, as defined in claim 1, wherein said first signal is continuous and said second signal is intermittent, and further wherein said processing means samples said first signal upon receiving said second signal, said processing means operatively combining said sampled first signal with said second signal to define said data point.

6. An apparatus, as defined in claim 3, wherein said processing means includes means for fitting a closed curve to said data points and calculating a center for said closed curve.

7. An apparatus, as defined in claim 6, wherein said closed curve defines a planar figure and said calculated center is a centroid for said figure.

8. An apparatus, as defined in claim 6, wherein said processing means includes means for inscribing a first circle within said closed curve, said inscribed circle being centered upon said calculated center and having a first radius, and further wherein said processing means includes means for circumscribing a second circle about said closed curve, said circumscribed circle being centered upon said calculated center and having a second radius, said processing means calculating a difference between said first and second radii.

9. An apparatus, as defined in claim 6, wherein said processing means includes means for calculating the distance between the axis of rotation and said calculated center of said closed curve.

10. An apparatus, as defined in claim 1, wherein said means for sensing variation includes a linear voltage displacement transducer, said transducer operatively connected to an arm, said arm adapted to extend into the brake drum and having an end adapted to contact said braking surface, said transducer generating a signal which is a function of the radial position of said end of said arm.

11. An apparatus, as defined in claim 10, wherein said linear voltage displacement transducer is a linear variable differential transformer having a movable core, said core being operatively connected to said arm to move therewith.

12. An apparatus, as defined in claim 1, wherein said means for sensing angular position includes an optical encoder, said encoder adapted to monitor the angular position of the brake drum and generate said second signal.

13. A method for measuring the circularity of a brake drum, the drum being mounted upon a vehicle and rotatable about an axis of rotation, the method comprising the steps of:

(a) mounting a means upon the vehicle for sensing a variation of a distance extending from the axis of rotation to a braking surface formed on an inner surface of the brake drum, the variation sensing means generating a first signal proportional to the variation;

(b) providing a means for sensing an angular position of the brake drum and generating a second signal indicative of the angular position of the drum;

(c) rotating the brake drum;

(d) combining successive pairs of values of the first and second signals generated as the drum is rotated to define a plurality of data points;

(e) fitting a closed curve to the data points;

(f) calculating a center of the closed curve;

(g) fitting an inscribed circle within the closed curve, the inscribed circle being centered upon the calculated center of the closed curve and having a first radius;

(h) fitting a circumscribed circle about the closed curve, the circumscribed circle being centered upon the calculated center of the closed curve and having a second radius; and (i) calculating the difference between the first and second radii.

14. A method according to claim 13 wherein the center calculated of the closed curve in step (f) is the centroid of a planar figure having a circumference defined by the closed curve.

15. A method according to claim 13 wherein step (e) includes smoothing the data points prior to fitting the closed curve to the data points.

16. A method according to claim 13 wherein step (d) includes generating each second signal when the drum is rotated through a predetermined number of degrees.

17. A method according to claim 13 wherein the first signal generated in step (a) is continuous and the second signal generated in step (b) is intermittent and further wherein step (d) includes providing a processing means which samples the first signal upon receiving the second signal, the processing means operatively combining successive sampled first signals with successive second signals to define the data points.

18. A method according to claim 13 further including the step of:

(j) determining the distance between the axis of rotation and the calculated center of the closed curve.

19. A method according to claim 13 wherein step (i) also includes determining a maximum variation in distance between the calculated center of the closed curve and the closed curve over a sector of the closed curve having a predetermined number of degrees.

20. A method according to claim 19 wherein the sector includes 30 degrees.

21. A method according to claim 13 wherein step (d) includes determining a maximum and minimum distance between the axis of rotation and the data points.

22. A method according to claim 13 wherein step (e) includes determining a maximum and minimum distance between the axis of rotation and the closed curve.

23. A method according to claim 13 wherein the means for sensing variation of a distance in step (a) includes a linear voltage displacement transducer, the transducer operatively connected to an arm, the arm adapted to extend axially into the brake drum and having an end adapted to contact the braking surface, the transducer generating a signal which is a function of the radial position of the end of the arm.

24. A method according to claim 13 wherein the means for sensing angular position in step (b) includes an optical encoder, the encoder adapted to monitor the angular position of the brake drum and generate the angular position signal.

* * * * *